(12) United States Patent
Zeuner et al.

(10) Patent No.: US 12,092,852 B2
(45) Date of Patent: Sep. 17, 2024

(54) OPTICAL DEVICE HAVING FAN-OUT WAVEGUIDES AND BUS WAVEGUIDE

(71) Applicants: VitreaLab GmbH, Vienna (AT); CONSIGLIO NAZIONALE DELLE RICERCHE, Rome (IT)

(72) Inventors: Jonas Zeuner, Vienna (AT); Chiara Greganti, Vienna (AT); Francesco Pellegatta, Vienna (AT); Ioannis Pitsios, Vienna (AT); Roberto Osellame, Rome (IT)

(73) Assignees: VITREALAB GMBH, Vienna (AT); CONSIGLIO NAZIONALE DELLE RICERCHE, Rome (IT)

( * ) Notice: Subject to any disclaimer, the term of this patent is extended or adjusted under 35 U.S.C. 154(b) by 0 days.

(21) Appl. No.: 18/000,721

(22) PCT Filed: Jun. 18, 2021

(86) PCT No.: PCT/EP2021/066616
§ 371 (c)(1),
(2) Date: Dec. 5, 2022

(87) PCT Pub. No.: WO2021/255241
PCT Pub. Date: Dec. 23, 2021

(65) Prior Publication Data
US 2023/0213696 A1  Jul. 6, 2023

(30) Foreign Application Priority Data

Jun. 19, 2020 (EP) .................................... 20425020

(51) Int. Cl.
*G02B 6/00* (2006.01)
*F21V 8/00* (2006.01)
(52) U.S. Cl.
CPC ................. *G02B 6/0028* (2013.01)

(58) Field of Classification Search
CPC .... G02B 6/0011; G02B 6/002; G02B 6/0023; G02B 2006/1215; G02B 6/122; G02B 6/125

See application file for complete search history.

(56) References Cited

U.S. PATENT DOCUMENTS 4,107,518 A * 8/1978 McMahon ........... H04B 10/272
                                                         398/64
4,234,969 A * 11/1980 Singh .................... G02B 6/2817
                                                         385/24

(Continued)

FOREIGN PATENT DOCUMENTS

| EP | 3 599 541 A1 | 1/2020 |
| WO | 2007/046100 A2 | 4/2007 |
| WO | 2016/039166 A1 | 3/2016 |

OTHER PUBLICATIONS

International Search Report and Written Opinion for corresponding International Application No. PCT/EP2021/066616 mailed Sep. 2, 2021.

(Continued)

*Primary Examiner* — Ismael Negron
(74) *Attorney, Agent, or Firm* — Pearne & Gordon LLP

(57) ABSTRACT

An optical device including a primary fan-out waveguide; at least one secondary fan-out waveguide; a fan-out optical coupler for coupling a light beam between the primary fan-out waveguide and the secondary fan-out waveguide; at least one bus waveguide associated with the at least one secondary fan-out waveguide and different from each secondary fan-out waveguide; and a reflecting and coupling structure connecting the secondary fan-out waveguide and the bus waveguide.

12 Claims, 11 Drawing Sheets

(56) References Cited

U.S. PATENT DOCUMENTS

| | | | | |
|---|---|---|---|---|
| 4,246,475 | A * | 1/1981 | Altman | H04B 10/27 |
| | | | | 385/44 |
| 4,317,614 | A * | 3/1982 | Palmer | G02B 6/4289 |
| | | | | 250/227.24 |
| 6,226,426 | B1 | 5/2001 | Magne et al. | |
| 6,839,478 | B2 * | 1/2005 | Huber | G02B 6/3502 |
| | | | | 385/125 |
| 7,499,615 | B2 * | 3/2009 | Tan | G02B 6/43 |
| | | | | 385/27 |
| 8,165,433 | B2 * | 4/2012 | Jenkins | G02B 6/3596 |
| | | | | 385/125 |
| 10,487,356 | B2 * | 11/2019 | Lundquist | G01N 21/648 |
| 11,181,691 | B2 * | 11/2021 | Lu | G02B 6/12002 |
| 2004/0047537 | A1 * | 3/2004 | Boord | G02B 6/122 |
| | | | | 385/14 |
| 2005/0285285 | A1 * | 12/2005 | Watanabe | B29C 45/372 |
| | | | | 264/1.24 |
| 2006/0120725 | A1 * | 6/2006 | Braun | H04J 14/0201 |
| | | | | 398/83 |
| 2008/0107380 | A1 | 5/2008 | Levner et al. | |
| 2016/0085027 | A1 * | 3/2016 | Chan | G02B 6/264 |
| | | | | 385/24 |
| 2021/0157443 | A1 | 5/2021 | Zeuner et al. | |

OTHER PUBLICATIONS

Extended European Search Report for corresponding European Application No. 20425020.3 dated Nov. 23, 2020.

Travis et al., "Collimated light from a waveguide for a display backlight", Opt. Express 17, p. 19714-19719; 2009.

Ross, "Ion-exchange glass waveguide sensors", Glass Integrated Optics and Optical Fiber Devices: A Critical Review, 102750C; Jul. 25, 1994.

Van Acoleyen et al., "Optical Retroreflective Marker Fabricated on Silicon-On-Insulators", IEEE Photonics Journal; vol. 3, Issue 5, Oct. 2011, p. 789-798.

* cited by examiner

OPTICAL DEVICE HAVING FAN-OUT WAVEGUIDES AND BUS WAVEGUIDE

CROSS-REFERENCE TO RELATED APPLICATIONS

This is a National Stage application of PCT international application PCT/EP2021/066616 filed on Jun. 18, 2021, which claims the priority of European Patent Application No. 20425020.3, filed Jun. 19, 2020, which are incorporated herein by reference in their entireties.

FIELD OF THE INVENTION

The present disclosure concerns an optical device comprising: a primary fan-out waveguide; at least one secondary fan-out waveguide; a fan-out optical coupler for coupling a light beam between the primary fan-out waveguide and the secondary fan-out waveguide; and at least one bus waveguide associated with the at least one secondary fan-out waveguide and different from each secondary fan-out waveguide.

BACKGROUND OF THE INVENTION

There are some devices known in the prior art which distribute light uniformly over a certain area or which receive light from distinct channels distributed over a certain area. For certain applications, such as backlight units for LCDs, these devices need to be compact, in particular thin (orthogonally to the certain area) and comprising a minimal bezel around the certain (active) area.

The paper "Collimated light from a waveguide for a display backlight" by Travis et al in Opt. Express 17, 19714-19719 (2009), shows a classical approach to such a backlight unit. Therein, light emitted from a point source is fanned out in a waveguide plate. The light is reflected at one side facet of the plate, fills out essentially the whole area and subsequently has to be emitted from a top face of the plate. However, such devices are known to lack uniformity, efficiency and compactness.

An approach for sensing applications is shown in "Ion-exchanged glass waveguide sensors" by Ross in Glass Integrated Optics and Optical Fiber Devices: A Critical Review, 102750C (25 Jul. 1994). This paper shows a sensor array with four parallel Mach-Zehnder interferometers. For this purpose, light is transmitted through a single-mode fiber, which is coupled to an integrated optical chip and split into four waveguide channels guiding to four sensor elements. The fan-out into four waveguide channels is achieved by a first splitter and two subsequent splitters. Subsequently, all of the beams are emitted from a side of the integrated optical chip opposite to the side where they are coupled into the chip. However, such a fan-out requires a large area and if the area to be covered should for example be rectangular, this active area could only be provided after the fan-out has been completed to the complete width and number of channels.

The main constraints for such a fan out are the length of the coupling/splitting mechanism and the bending losses depending on the waveguide bending radius. The waveguides splitting off from each other have to bend away from each other to reach the required distance, e.g. a pixel pitch in a display application.

An alternative approach is shown in WO 2007/046100 A2. Therein, a waveguide leading from a laser diode is coupled to subsequent waveguides, which bend by 90° towards respective rows of pixels. While this may limit the fan-out length to the bending radius of the waveguides, it still requires the bezel around two sides of the active area to be in the order of the bending radius, which is too large for some applications.

Furthermore, it would be possible to use waveguides which are twice bent by 90°, such as is shown in "Optical Retroreflective Marker Fabricated on Silicon-On-Insulator" by Van Acoleyen et al in IEEE Photonics Journal (Volume: 3, Issue: 5, October 2011), pages 789-798. However, these do not allow a small bezel on all sides of an active area and such bent waveguides introduce high optical loss.

BRIEF SUMMARY OF THE INVENTION

It is an objective of the present invention to prevent or alleviate at least one of the disadvantages of the prior art. In particular a fan-out or fan-in of waveguides to/from a certain active area shall be achieved in a compact way and the bezel around such an active area should be reduced. Optionally, also the optical loss resulting from the fan-out or fan-in of the waveguides shall be reduced.

This is achieved by an optical device as mentioned in the outset, which comprises a reflecting and coupling structure connecting the secondary fan-out waveguide and the bus waveguide.

By using a reflecting and coupling structure connecting the secondary fan-out waveguide and the bus waveguide, a light beam can be fanned-out or fanned-in in a compact way, since there is no need for a bezel around a certain active area (to be covered) of the size of the bending radius of the fan-out waveguides, which is limited by bending losses. In particular, the light can be fanned-out from the primary fan-out waveguide to the secondary fan-out waveguide, and due to the use of the reflecting and coupling structure, the bus waveguide can guide light to a section that cannot be covered by the secondary fan-out waveguide. This section could for example be close to the fan-out optical coupler or next to the primary fan-out waveguide prior to the fan-out optical coupler. Thus, the primary fan-out waveguide and the fan-out optical coupler can be partially or completely contained within the active area which shall be illuminated and no bezel around that area is necessary. Furthermore, by using distinct waveguides for fanning-out or fanning-in the light beam, a higher uniformity and lower losses are achieved.

Fan-out refers to the distribution of light from one waveguide (or a number of waveguides) to further waveguides (or a further number of waveguides, wherein the number is preferably larger than the initial number). Therein, optionally, the waveguides can be single-mode optical waveguides. Optionally, the waveguides can have a low index contrast ($n2-n1 \ll 1$). The light can, but does not need to be coupled from the bus waveguide out to a number of pixels. The optical device primarily aims at covering some area with a bus waveguide (or more bus waveguides), from which light could be coupled out to a number of pixels. This subsequent coupling out could be achieved by the present optical device or in any other way, for example by a further device not part of the present disclosure.

The description in the context of fan-out refers analogously in reversed mode of operation to a fan-in, which can for example be used in sensing applications, for example touch recognition devices. The primary fan-out waveguide, the secondary fan-out waveguide and the fan-out coupler are equally a primary fan-in waveguide, a secondary fan-in waveguide and a fan-in coupler, if the optical device is used for fanning-in.

Reflecting and coupling structure refers to a structure that couples light between the two waveguides (e.g. by means of a directional coupler) and wherein a light beam is reflected at least at one point, such that a direction of propagation of the light beam along at least one of the waveguides is reversed. Optionally, the reflecting and coupling structure couples a light beam from
- (in particular in the case of fan-out:) the secondary fan-out waveguide to the bus waveguide such that the light beam travels in the bus waveguide at least in a direction reverse to the direction it was traveling in the secondary fan-out waveguide before coupling or
- (in particular in the case of fan-in:) the bus waveguide to the secondary fan-out waveguide such that the light beam travels in the secondary fan-out waveguide at least in a direction reverse to the direction it was traveling in the bus waveguide before coupling. The reverse direction in particular refers to sections of the secondary fan-out waveguide and the bus waveguide, wherein the two waveguides extend substantially alongside one another.

Optionally, the secondary fan-out waveguide and/or the bus waveguide comprise a core surrounded by a cladding material, and there can be provided for at least one face, which comprises an index contrast which is larger than the index contrast between the core and the cladding material. Thereby, sufficient reflection can be achieved even though the angle of incidence of a light beam on the face is not larger than the angle of critical reflection for the core—cladding material boundary. Optionally, a light beam is guided in a first section of (at least) one of the bus waveguide and the secondary fan-out waveguide at least in one direction and a light beam is guided in a second section of the one of the bus waveguides and the secondary fan-out waveguide in at least the opposite direction.

Optionally, the primary fan-out waveguide, the secondary fan-out waveguide and the bus waveguide are distinct from each other. Optionally, the primary fan-out waveguide is different from the secondary fan-out waveguide and/or the bus waveguide. Optionally, at least a section of the bus waveguide is parallel to a section of the secondary fan-out waveguide. Optionally, the fan-out optical coupler comprises a section wherein the primary fan-out waveguide and the secondary fan-out waveguide draw near to one another and optionally extend proximate from one another over a coupling section of each waveguide. Optionally, the coupling section of the primary fan-out waveguide and the secondary fan-out waveguide has a length of less than 500 µm, further optionally of less than 100 µm, further optionally of less than 20 µm. The primary fan-out waveguide and the secondary fan-out waveguide extend in the coupling section in a coupling distance from one another, which is optionally less than 200 µm, further optionally less than 60 µm, further optionally less than 20 µm. Optionally, the coupling distance is at least 1 µm.

The optical device comprises optionally at least 10, further optionally at least 100, further optionally at least 1,000, further optionally at least 10,000, secondary fan-out waveguides, wherein there is provided for a fan-out coupler each for coupling a light beam between the primary fan-out waveguide and the respective secondary fan-out waveguide or for coupling a light beam between two secondary fan-out waveguides; at least one bus waveguide associated with each of the secondary fan-out waveguides and different from each secondary fan-out waveguide; and a reflecting and coupling structure connecting each secondary fan-out waveguide and the respective at least one bus waveguide.

Optionally, the reflecting and coupling structure is an interferometric structure for coupling a light beam traveling in the secondary fan-out waveguide into the bus waveguide or coupling a light beam traveling in the bus waveguide into the secondary fan-out waveguide optionally such that at least a fraction of the coupled light beam travels in the opposite direction after leaving the interferometric structure. Interferometric structure refers to that light is coupled from one of the secondary fan-out waveguide and the bus waveguide to the other one of the secondary fan-out waveguide and the bus waveguide such that it interferes with light that is traveling in the other one of the secondary fan-out waveguide and the bus waveguide and that was previously reflected in the other one of the secondary fan-out waveguide and the bus waveguide. Traveling in the opposite directions refers to that when the light beam arrives at the interferometric structure in one of the bus waveguide and the secondary fan-out waveguide, it leaves the interferometric structure in the other one of the bus waveguide and the secondary fan-out waveguide in a direction, which has an angle of more than 90° to the initial direction. Thus, the reversal of direction is achieved in an efficient and compact way and without the disadvantages of using a bent waveguide for that purpose. The interferometric structure optionally comprises a beam splitter, which can be an optical coupler for coupling light between the secondary fan-out waveguide and the bus waveguide, and/or a beam combiner, which can be an optical coupler for coupling light between the secondary fan-out waveguide and the bus waveguide, wherein in particular the beam splitter and the beam combiner are formed by the same optical coupler. The interferometric structure can be a Michelson interferometric structure (i.e., the beams are splitted and combined by the same element). Optionally, the interferometric structure is a balanced Michelson interferometric structure and/or a folded Mach-Zehnder interferometric structure. Optionally, the interferometric structure is passive, i.e. the optical path lengths in the interferometric structure are fixed. Optionally, the interferometric structure comprises at least four arms, wherein two arms are formed by each of the secondary fan-out waveguide and the bus waveguide.

One arm of each of the secondary fan-out waveguide and the bus waveguide is the input and output arm. The other arm of each of the secondary fan-out waveguide and the bus waveguide can be made arbitrarily short. Optionally, the optical path lengths are set such that for a light beam entering the interferometric structure at one input and output arm, a majority (i.e. more than 50 intensity-%) of that light beam leaves the interferometric structure at the other input and output arm.

Many different layouts are possible for the reflecting and coupling structure. For example, each arm of the reflecting and coupling structure or the interferometric structure can lead again to a reflecting and coupling structure or to an interferometric structure, i.e. for example be split again into an interferometer (with or without use). Thus, complexity can be increased a lot.

Optionally, at least a section of the bus waveguide extends alongside at least a section of the secondary fan-out waveguide, in particular substantially parallel to a section of the secondary fan-out waveguide.

Optionally, the reflecting and coupling structure comprises an optical coupler (labelled "bus optical coupler") for coupling a light beam between the secondary fan-out waveguide and the bus waveguide, wherein optionally substantially 50% of the light beam is coupled between the secondary fan-out waveguide and the bus waveguide on passing the optical coupler in one direction. Optionally, the bus optical coupler comprises a section wherein the secondary fan-out waveguide and the bus waveguide draw near to one another and optionally extend proximate from one another over a coupling section of each waveguide. Optionally, the coupling section of the secondary fan-out waveguide and the bus waveguide has a length of less than 500 µm, further optionally of less than 100 µm, further optionally of less than 20 µm. The secondary fan-out waveguide and the bus waveguide extend in the coupling section in a coupling distance from one another, which is optionally less than 200 µm, further optionally less than 60 µm, further optionally less than 20 µm. The bus waveguide and the secondary fan-out waveguide each extend from the bus optical coupler in at least one direction. Optionally, they each extend in two directions from the optical coupler.

Optionally, the reflecting and coupling structure comprises a bus reflective face for at least partially reflecting a light beam in the bus waveguide and a secondary fan-out reflective face for at least partially reflecting a light beam in the secondary fan-out waveguide. Thus, light coupled in the reflecting and coupling structure between the bus waveguide and the secondary fan-out waveguide can be reflected in each of the waveguides, such that it can be coupled between the waveguides in the opposite direction again, thereby in particular leading to interference effects. Optionally, the optical paths between the bus optical coupler and the bus reflective face and between the bus optical coupler and the secondary fan-out reflective face are set such that after passing the bus optical coupler once in the forward direction and once in the backward direction the light beam travels substantially in the one of the bus waveguide and the secondary fan-out waveguide, where it did not travel initially (prior to the bus optical coupler). The optical path and therefore the bus waveguide and the secondary fan-out waveguide can be made arbitrarily short between the optical coupler and the bus reflective face and, respectively, the secondary fan-out reflective face. The bus reflective face and/or the secondary fan-out reflective face can directly follow the bus optical coupler, i.e. it is not necessary to separate the bus waveguide and the secondary fan-out waveguide before reflection takes place. In this way a reflecting and coupling structure with a length of less than 100 µm is achieved. It is also possible to have multiple layers including more than one reflection at different facets for distributing light and optionally, to monitor or analyse the light along the way. This may slightly increase the thickness of the optical device, while still not necessitating a bezel around the active area. For example, additionally to the two layers formed by the secondary fan-out waveguide and the bus waveguide, it is possible to have at least one additional layer. I.e. there can be a further reflecting and coupling structure connecting the bus waveguide to a further bus waveguide. This further reflecting and coupling structure can for example be formed by an interface (e.g. of below mentioned substrate), which also comprises an input face, wherein light can be coupled into the primary fan-out waveguide (e.g. from a light source). This interface can comprise a reflective coating. Light can then be guided from the further reflecting and coupling structure by the further bus waveguide in substantially the same direction as in the primary fan-out waveguide. Optionally, at an end of this further bus waveguide, which may be on the same face as the bus reflective face and/or the fan-out reflective face, a detector, in particular a photodiode, can be located to measure the light power. In this case, if the bus reflective face and/or the fan-out reflective face are provided by a reflective coating, this coating is optionally not provided at the end of the further bus waveguide. Another option is reflecting from faces which are consecutive and therefore at a 90° between each other.

Optionally, the optical path length between the optical coupler of the reflecting and coupling structure and the reflective face in the bus waveguide is the same as the optical path length between the optical coupler of the reflecting and coupling structure and the reflective face in the secondary fan-out waveguide. In general, if the optical device is used with a light source, the optical path lengths modulo a wavelength of the light source are the same. Thus, destructive interference can be achieved in the waveguide, in which the light beam traveled initially (i.e. in which the light beam is arriving at the reflecting and coupling structure) and constructive interference can be achieved in the other waveguide. Consequently, a light beam entering the reflecting and coupling structure in one waveguide will leave the reflecting and coupling structure in the other waveguide, and in particular backwards (i.e. in reversed direction). Of course, this can also be achieved by other structures, in particular interferometric structures.

Optionally, the secondary fan-out waveguide and the bus waveguide are provided in a (in particular transparent) substrate, further optionally they are produced by femtosecond direct laser writing. Thereby, a particularly compact design can be achieved. By femtosecond direct laser writing the waveguides, the waveguides can be created at arbitrary depths within the substrate and can bend in any direction. Due to this possibility for 3D waveguide trajectories, a more compact design (i.e. a high density of waveguides per volume) and furthermore waveguides with low optical losses can be achieved. Optionally, the substrate extends in three dimensions, wherein the substrate's extension ("depth") in one dimension is at least 5 times, further optionally at least 10 times, lower than the substrate's extension in the other two dimensions ("length" and "width"). The dimension could be 25 times 25 times 0.5 mm³. Optionally, a section of the substrate's surface is an active area, which is to be illuminated or from where light shall be collected. Optionally, the active area is on one of the substrate's surfaces that delimit the substrate in the depth-direction. Optionally, the primary fan-out waveguide and/or any other waveguide of the optical device are also provided in the transparent substrate. Optionally, the transparent substrate comprises alumino-borosilicate glass, for example Corning® Eagle XG®. Optionally, the bus waveguide is substantially parallel to the active area. Optionally, the bus waveguide is substantially parallel to the secondary fan-out and is spaced from the secondary fan-out waveguide both in the width and the depth dimension for most of its length, apart from close to the reflecting and coupling structure. At the reflecting and coupling structure, the bus waveguide and the secondary fan-out waveguide may be brought to the same depth level, however, they may remain spaced apart in the width dimension. For coupling between the secondary fan-out waveguide and the bus waveguide, they may be approached in the width dimension to achieve a coupling.

Femtosecond direct laser writing (FDLW, often also called femtosecond laser direct inscription) optionally comprises one or more of the following step:
   provide for a substrate, which comprises a transparent dielectric material and/or which comprises glass, ceramic, polymer and/or crystalline material;
   use multiphoton (i.e. more than 2-photon) absorption of photons with energies below the bandgap of the material of the substrate and/or wherein the pulses are femtosecond pulses at low to medium frequencies, e.g. between 20 kHz and 10 MHz, optionally between 80 kHz and 5 MHz in particular between 100 kHz and 2 MHz and even more particularly between 500 kHz and 1.5 MHz, and/or wherein the pulses have a medium pulse width, e.g. between 40 fs and 2 ps, optionally between 100 fs and 1 ps, in particular between 200 fs and 400 fs.

Another technique of laser writing is 2PP (2-photon polymerisation) laser writing, which may comprise two photon lithography or multiphoton lithography. In contrast to femtosecond direct laser writing, it may contain one or more of the following steps or properties:

use femtosecond pulses at typically high frequencies, e.g. 80 MHz and with low pulse width <100 fs;

two-photon absorption is a third-order process with respect to the third-order susceptibility and a second-order process with respect to light intensity;

provide for a special resist (a photosensitive material) that is highly transparent to photons of wavelength lambda but highly absorptive for photons of wavelength lambda/2.

Optionally, the bus reflective face and/or the secondary fan-out reflective face are provided by a facet of the transparent substrate and/or a (reflective) coating of a facet of the transparent substrate. The coating can comprise for example silver, aluminium, gold and/or a dielectric coating.

Optionally, the optical device comprises at least one pixel waveguide (or pixel-specific waveguide), which receives a light beam from the at least one bus waveguide or directs a light beam to the at least one bus waveguide, wherein optionally the pixel waveguide bends away from the bus waveguide. Optionally, there is provided for more than one pixel waveguide associated (as described above) with the bus waveguide, further optionally, there is provided for at least 10 pixel waveguides associated with the bus waveguide. Optionally, the at least one pixel waveguide is formed in the substrate. Optionally, the at least one pixel waveguide bends from the bus waveguide towards a surface of the substrate, in particular the active area. There can be provided for a pixel optical coupler for coupling light between the bus waveguide and the pixel waveguide. Preferably, each pixel waveguide is associated with a pixel or color subpixel of the active area (or of a liquid crystal layer covering the active area, with optional layers or films between the active area and the liquid crystal layer). Specifically, there may be a one-to-one relationship between each pixel waveguide and a pixel of the active area.

It is possible to couple light already out of the secondary fan-out waveguide. Optionally, there is provided for at least one further pixel waveguide, which receives a light beam from the at least one secondary fan-out waveguide or directs a light beam to the at least one secondary fan-out waveguide, wherein further optionally the further pixel waveguide bends away from the secondary fan-out waveguide. Thus, the average optical path length in the waveguides and hence transmission losses can be reduced.

Optionally, the optical device comprises a phase adjusting element for adjusting the relative optical path length of the secondary fan-out waveguide and of the bus waveguide in the reflecting and coupling structure, wherein the phase adjusting element further optionally comprises a phase shifter and/or a piezo-mirror. Thus, the intensity of the light beams in the bus waveguide, and subsequently a certain section of the active area, is adjustable. This is in particular useful for implementing local dimming in displays or in sensing application, for example when using the optical device in light detection and ranging (LIDAR) systems or optical touch recognition.

Optionally, the optical device comprises at least a further bus waveguide associated with the secondary fan-out waveguide and different from each secondary fan-out waveguide, wherein the reflecting and coupling structure also connects the secondary fan-out waveguide and the further bus waveguide. Thus, each secondary fan-out waveguide can be used to couple a light beam to more than one bus waveguide. I.e., a higher number of bus waveguides can not only be achieved by providing for more secondary fan-out waveguides as mentioned above, but also by connecting more bus waveguides with each secondary fan-out waveguide. Thus, a compact layout is achieved.

Optionally, these two measures are combined. The reflecting and coupling structure can comprise a tritter for coupling a light between the secondary fan-out waveguide, and the bus waveguide and the further bus waveguide. Thus, a particularly compact design is achieved. Furthermore, the fan-out optical coupler can be a tritter, such that a light beam can be coupled from the primary fan-out waveguide to more than one secondary fan-out waveguide at one point (or, more precisely, one interaction length).

A tritter is in particular a power splitting device comprising one input waveguide and three output waveguides. Its function is to split optical power (light) from one or more input waveguides (input port) to three output waveguides (output ports). The functionality can also be reversed. Its physical properties and principles of operation are similar to a regular directional coupler. The tritter allows to spread the optical power to other waveguides in less physical space, resulting in a reduced number of steps and of waveguides. Optionally, the tritter splits the power substantially equally to each output port, that is substantially 33% at each. Optionally, a cascade of tritters is used, wherein the primary fan-out waveguide is coupled to more than one secondary fan-out waveguide by a tritter, and these secondary fan-out waveguides are each connected to more than one further secondary fan-out waveguide by a tritter. Experiments have shown that tritter with splitting ratios varying by less than 5% can be achieved, wherein an interaction distance of the wavelengths in the tritter was 5 μm and the interaction length was 140 μm. Typically, the interaction distance could be in the size of the waveguide core (for example at least 1 μm) to 30 μm and/or the interaction length less than 300 μm. Cascades of four tritters structure have been fabricated, leading to a splitting of 1×81 outputs. Therefore, an active area with an output pixel pitch of 50 μm and total output width and length sizes of 4.05 mm and 21.31 mm, respectively, could be covered.

Optionally, the optical device comprises:
an additional primary fan-out waveguide;
at least one additional secondary fan-out waveguide;
an additional fan-out optical coupler for coupling a light beam between the additional primary fan-out waveguide and the additional secondary fan-out waveguide. Thus, light could be coupled in from a different light source or could be coupled to a different sensing device. The optional features mentioned above in the context of the primary fan-out waveguide, the (further) secondary fan-out waveguide and the fan-out coupler can also be implemented for the additional primary fan-out waveguide, the at least one additional secondary fan-out waveguide and the additional fan-out coupler. Thus, a fan-out or fan-in for multiple wavelengths/colors can be achieved by stacking the secondary fan-out waveguide and the additional secondary fan-out waveguide on top of each other and then interleave them at the point where they have to reach their respective bus waveguide (assuming that the bus waveguides are arranged at the same depth below the active area). In this way each reflecting and coupling structure per color remains independent of one another and therefore operates on a single wavelength, therefore achieving low optical losses.

Optionally, the primary fan-out waveguide is coupled to a light source for receiving a light beam from the light source. The light source can be a laser, in particular a single-mode laser diode. Optionally, the light source is configured for emitting light with a central wavelength of between 300 nm and 700 nm, and further optionally up to 2000 nm (in particular for sensing). There can be provided for more than one light source, wherein each light source is coupled to a different (additional) primary fan-out waveguide. Optionally, the light source (or one of the light sources, respectively) is configured for emitting light with a central wavelength of 460 nm, 530 nm or 630 nm. Therein, more than one light source can emit light in the same range, in particular, if the light sources illuminate different regions of the active area. Optionally, if more than one light source illuminates the same region (in particular the same pixels but different color subpixels) of the active area, they emit light of differing central wavelengths.

Furthermore, this disclosure concerns a backlight unit for a display, which comprises an optical device according to any of the embodiments described herein. Thereby, a compact, in particular flat, display is achieved. The backlight unit can be used in an LCD display.

BRIEF DESCRIPTION OF THE DRAWINGS

By way of example, the disclosure is further explained with respect to some selected embodiments shown in the drawings. However, these embodiments shall not be considered limiting for the disclosure.

DESCRIPTION OF EXAMPLE EMBODIMENTS

Figure 1:
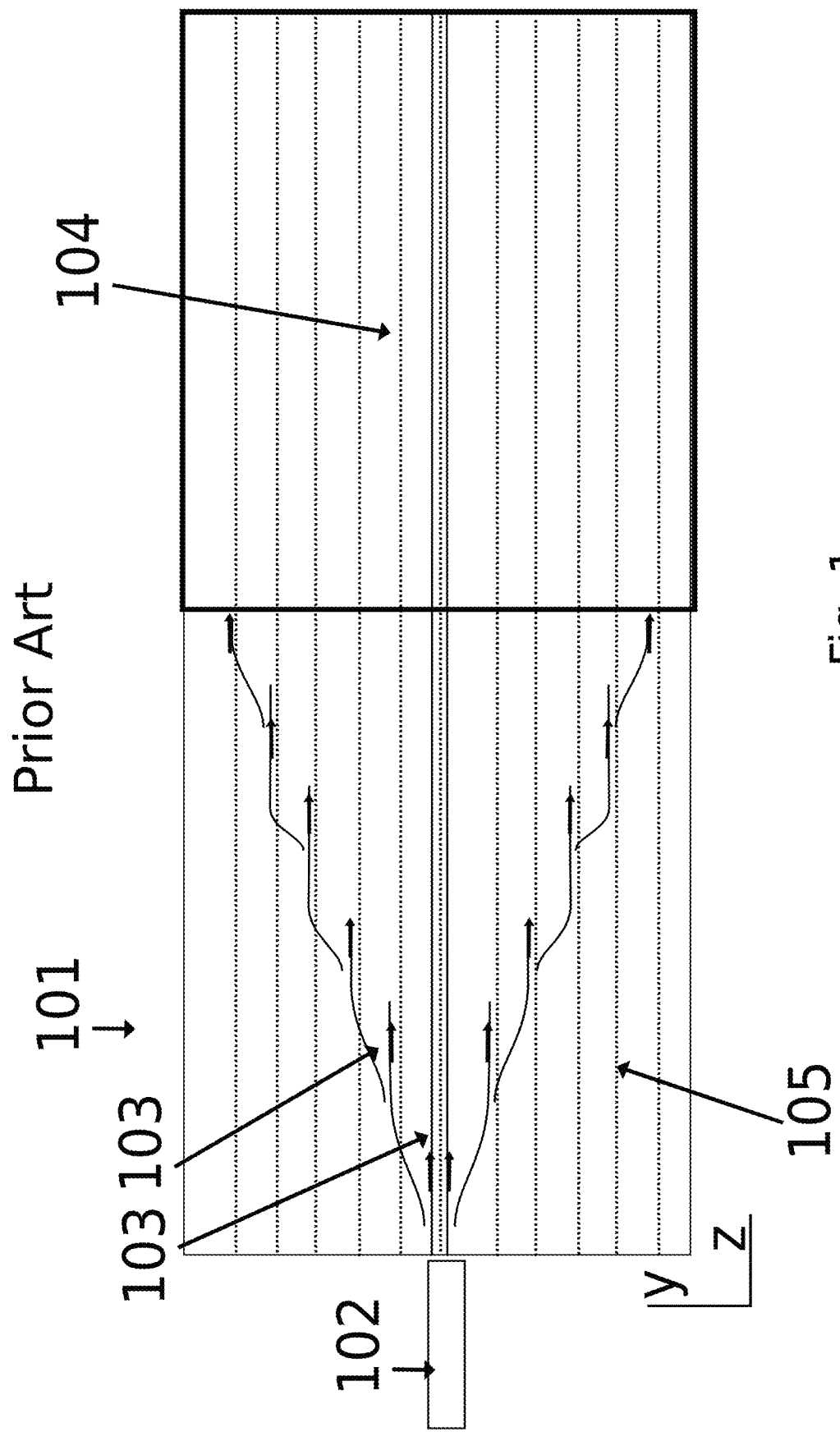
FIG. 1 schematically shows a top view of a prior art optical device.

FIG. 1 shows a top view of a prior art optical device 101 for fanning-out light. The optical device 101 has a light source 102 that couples light to a fan-out waveguide 103. From there, light is subsequently in a cascading way coupled out to further fan-out waveguides 103. For coupling, at first the fan-out waveguides 103 must propagate in parallel to allow for the light coupling from the first to the second fan-out waveguide 103. Then the second fan-out waveguide 103 starts curving away from the first one to reach the required distance, e.g. the pixel pitch in a display application. After fan-out to the complete width of the optical device 101 has been achieved, illumination of some active area 104 can be started. However, optical losses limit the minimal bending radii of the fan-out waveguides 103. Using a bending radius which still allows for low propagation loss, e.g. 10 mm, and a target distance of 100 μm (equivalent to the intended pixel pitch) the required propagation distance in the z-direction is ca. 2 mm for one optical coupler. Thus, it is impossible to achieve a fan-out without a considerable bezel 105 on at least one side of the active area.

Figure 2:
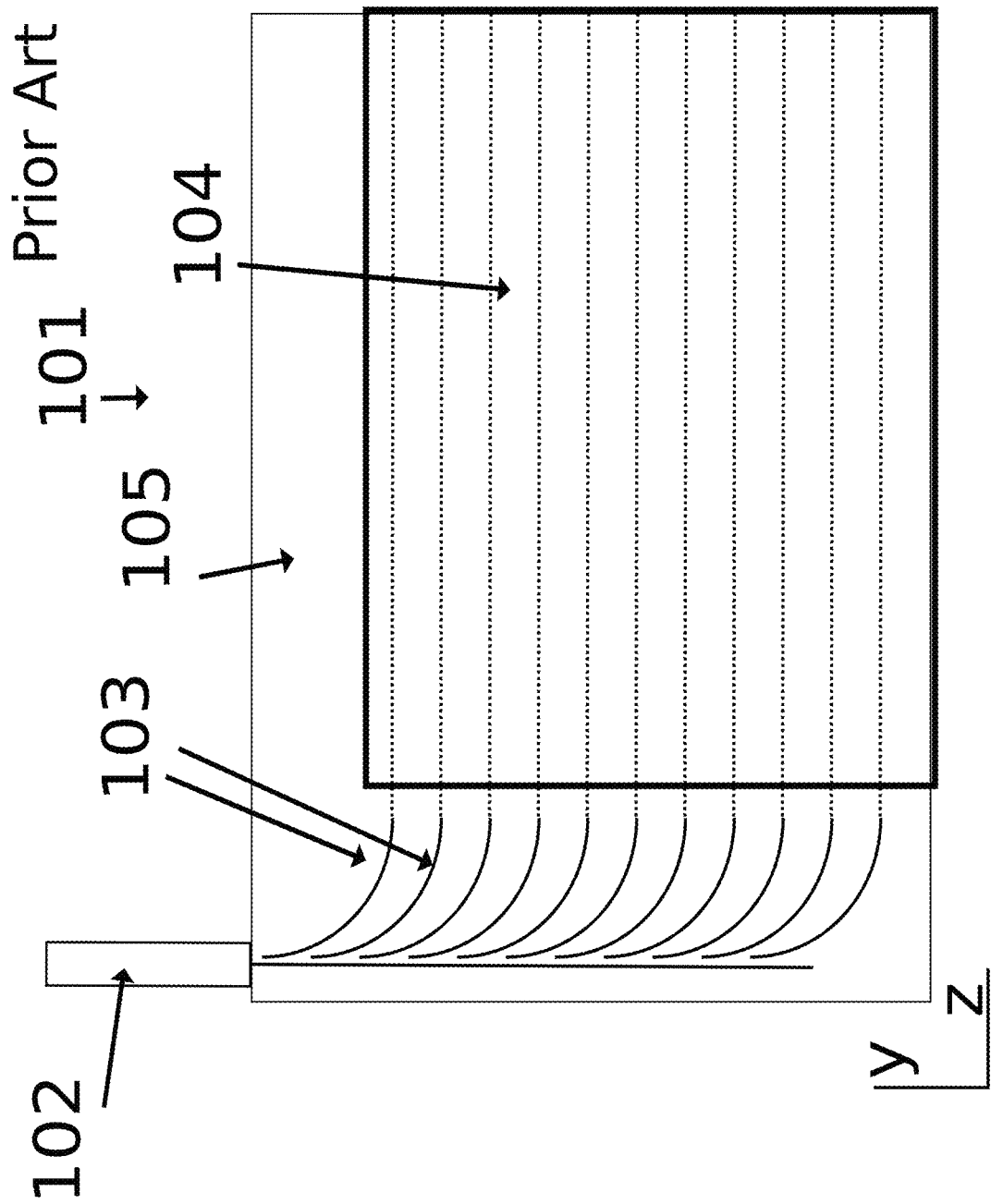
FIG. 2 schematically shows a top view of another prior art optical device.

FIG. 2 shows a top view of an alternative prior art optical device 101 for fanning-out light. Therein, a light source 102 is oriented at 90° with regard to a direction of extension of fan-out waveguides 103 over some active area 104. However, this still requires the bezel 105 around the active area 104 to be on the order of the bending radius at two sides of the display. In particular for mobile display applications, this is undesirable.

Figure 3:
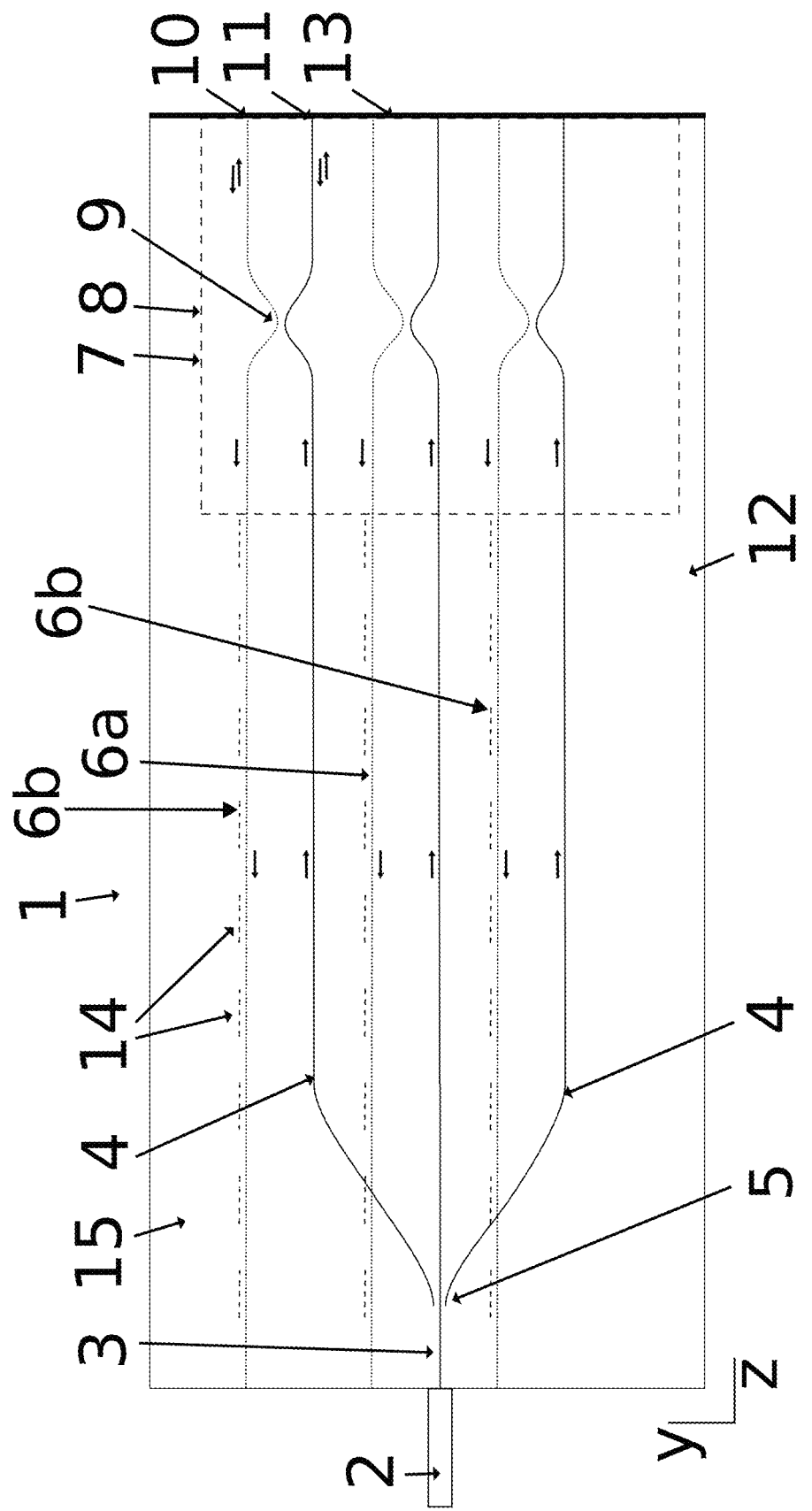
FIG. 3 schematically shows a top view of an embodiment of an optical device according to the present disclosure.
Figure 4:
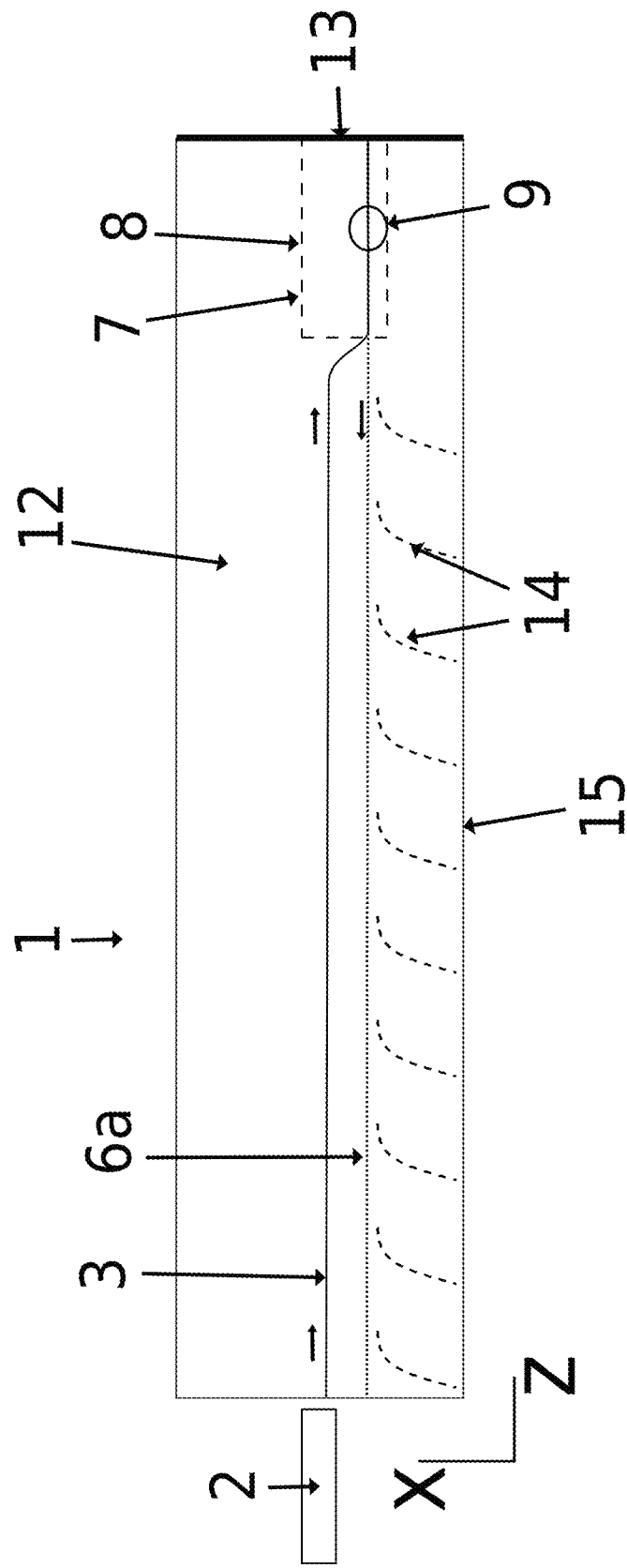
FIG. 4 schematically shows a side view of the same embodiment of the optical device as FIG. 3.

FIG. 3 schematically shows an embodiment of an optical device 1 according to the present disclosure in a top view (y-z-plane) and FIG. 4 shows the same embodiment in a side view (x-z-plane). The optical device 1 comprises a primary fan-out waveguide 3, two secondary fan-out waveguides 4, and a fan-out coupler 5 for coupling a light beam between the primary fan-out waveguide 3 and the secondary fan-out waveguides 4. In this embodiment, the fan-out coupler 5 is a tritter, such that light can be coupled to both secondary fan-out waveguides 4 with one coupler. However, the optical device 1 can equally only comprise one secondary fan-out waveguide 4 and the fan-out optical coupler 5 does not need to be a tritter. FIG. 4 is a side view in the plane, in which the primary fan-out waveguide 3 extends. However, it will be understood, that a side view of the secondary fan-out waveguides 4 will look similar, apart from that its extension in z-direction to the left will only reach to the fan-out optical coupler 5, as can be seen in FIG. 3.

Further, the optical device 1 comprises one bus waveguide 6b associated with each of the secondary fan-out waveguides 4 and there is also provided for one bus waveguide 6a associated with the primary fan-out waveguide 3. The optical device 1 comprises a reflecting and coupling structure 7 connecting each secondary fan-out waveguide 4 and the respective bus waveguide 6b. A similar reflecting and coupling structure also connects the primary fan-out waveguide 3 and the respective bus waveguide 6a. As can be seen from the figure, a majority of the bus waveguide 6b extends substantially parallel to a section of the secondary fan-out waveguide 4, which section makes up more than 50% of the length of the secondary fan-out waveguide 4.

Each reflecting and coupling structure 7 is an interferometric structure 8 for coupling a light beam traveling in the secondary fan-out waveguide 4 into the respective associated bus waveguide 6b (or, in particular if the optical device 1 is used for sensing applications, coupling a light beam traveling in the bus waveguide 6b into the respective associated secondary fan-out waveguide 4) such that at least a fraction of the coupled light beam travels in the opposite direction after leaving the interferometric structure 8. The arrows next to the waveguides 4, 6a, 6b are an idealized illustration of the direction the light beams are traveling in the respective waveguide.

The reflecting and coupling structure 7 comprises an optical coupler 9 (labeled "bus optical coupler") for coupling a light beam between the secondary fan-out waveguide 4 and the bus waveguide 6b on passing the bus optical coupler 9 in one direction, wherein substantially 50% of the light beam is coupled between the secondary fan-out waveguide 4 and the bus waveguide 6b on passing the bus optical coupler 9 in one direction. The length of the bus optical coupler 9, where the secondary fan-out waveguide 4 and the bus waveguide 6b are brought close to each other, can be less than 1 mm. Further-more, the reflecting and coupling structure 7 comprises a bus reflective face 10 for at least partially reflecting a light beam in the bus waveguide 6b and a secondary fan-out reflective face 11 for at least partially reflecting a light beam in the secondary fan-out waveguide 4. The optical path length between the bus optical coupler 9 and the bus reflective face 10 is the same as the optical path length between the bus optical coupler 9 and the secondary fan-out reflective face 11. Thus, the reflecting and coupling structure 7 forms a balanced Michelson interferometric structure and/or a folded Mach-Zehnder interferometric structure, and substantially all light that enters the reflecting and coupling structure 7 in the secondary fan-out waveguide 4 leaves the reflecting and coupling structure 7 in the bus waveguide 6b in the reversed direction (due to constructive interference in the bus waveguide 6b on passing the bus optical coupler 9 for a second time and destructive interference in the secondary fan-out waveguide 4 on passing the bus optical coupler 9 for a second time).

The primary fan-out waveguide 3, the secondary fan-out wave-guide 4 and the bus waveguide 6b are provided in a transparent substrate 12. They are produced by femtosecond direct laser writing, which is a method to achieve 3D trajectories of the waveguides. As can be seen from FIGS. 3 and 4, the bus wave-guide 6b and the secondary fan-out waveguide 4 or the primary fan-out waveguide, respectively, are substantially extending in parallel along the z-direction and are spaced from one another in the x-direction and in the y-direction for most of their length. Thus, there is no problem with interference at their seeming point of intersection in the top view. In the vicinity of the reflecting and coupling structure 7, they are brought to the same level in the x-direction, and at the bus optical-coupler 9 they are brought close to one another also in the y-direction. The bus reflective face 10 and the secondary fan-out reflective face 11 are provided by a facet 13 of the transparent substrate 12.

The optical device 1 comprises a plurality of pixel waveguides 14, which each receive a light beam from one of the bus wave-guides 6a, 6b (or, in particular when using the optical device 1 for sensing applications, direct a light beam to one of the bus waveguides 6a, 6b). The pixels waveguides 14 bend away from the respective bus waveguide 6a, 6b and bend towards a top surface 15 of the substrate 12, which comprises an active area that is to be illuminated by the optical device 1. If the optical device 1 is used as a backlight unit, each pixel wave-guide 14 can for example illuminate one pixel or one color subpixel e.g. of a liquid crystal display (LCD). The pixel waveguides 14 can receive the light from the respective bus waveguide 6a, 6b via an optical coupler, e.g. by bringing the pixel waveguide 14 close to the respective bus waveguide 6a, 6b.

The optical device 1 comprises a light source 2, wherein a light beam emitted from the light source 2 is coupled into the primary fan-out waveguide 3, and is subsequently distributed via the secondary fan-out waveguides 4 and the bus waveguides 6b to the pixel waveguides 14. By using the reflecting and coupling structures 7 for coupling light between the secondary fan-out waveguides 4 and the bus waveguides 6b, the entire ex-tension of the substrate 12 in the y- and z-directions can be used for fanning-out, the active area can cover essentially the entire top surface 15 and there is no necessity for a bezel around the active area.

Figure 5:
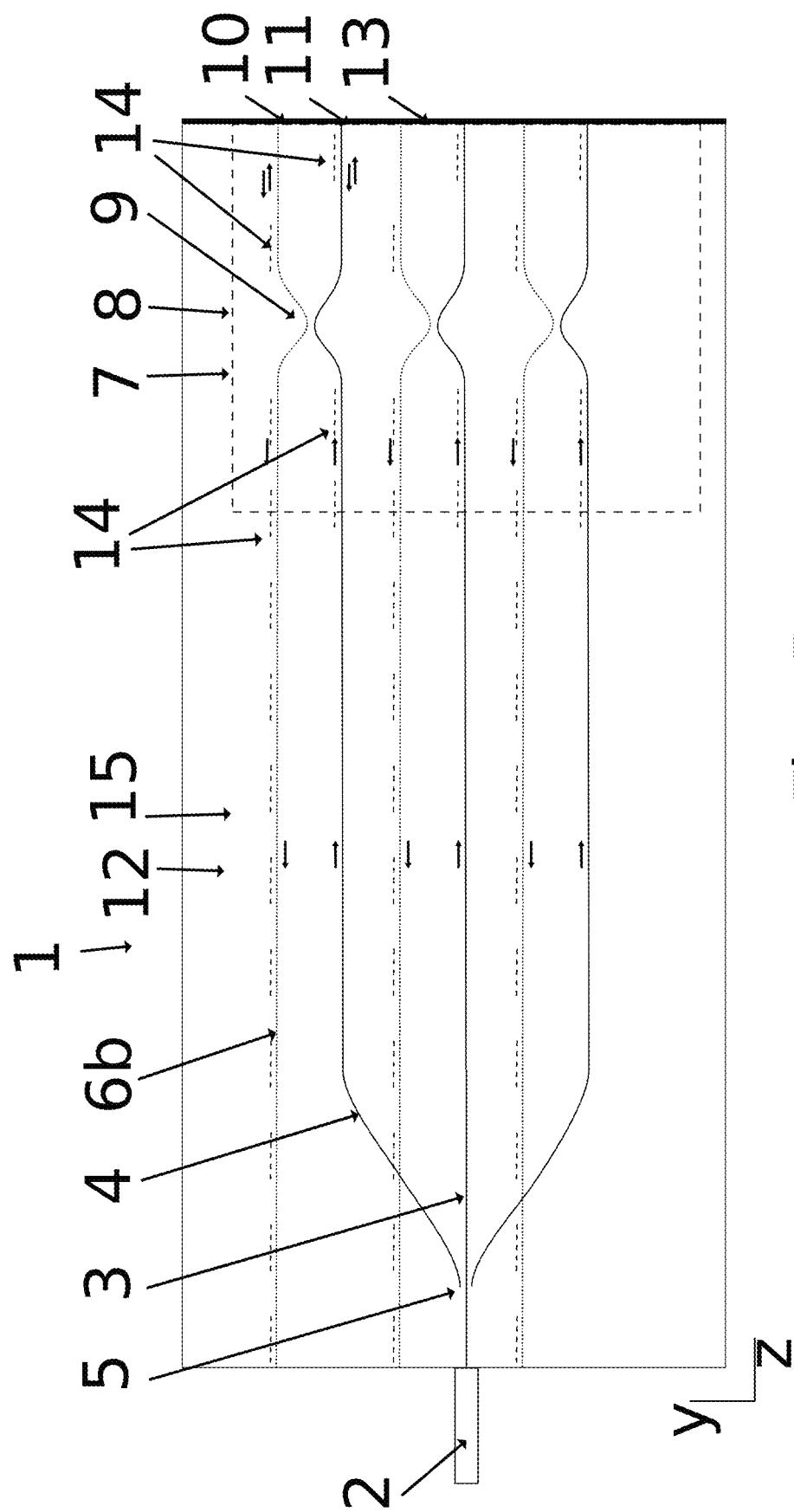
FIG. 5 schematically shows a top view of another embodiment of an optical device according to the present disclosure.
Figure 6:
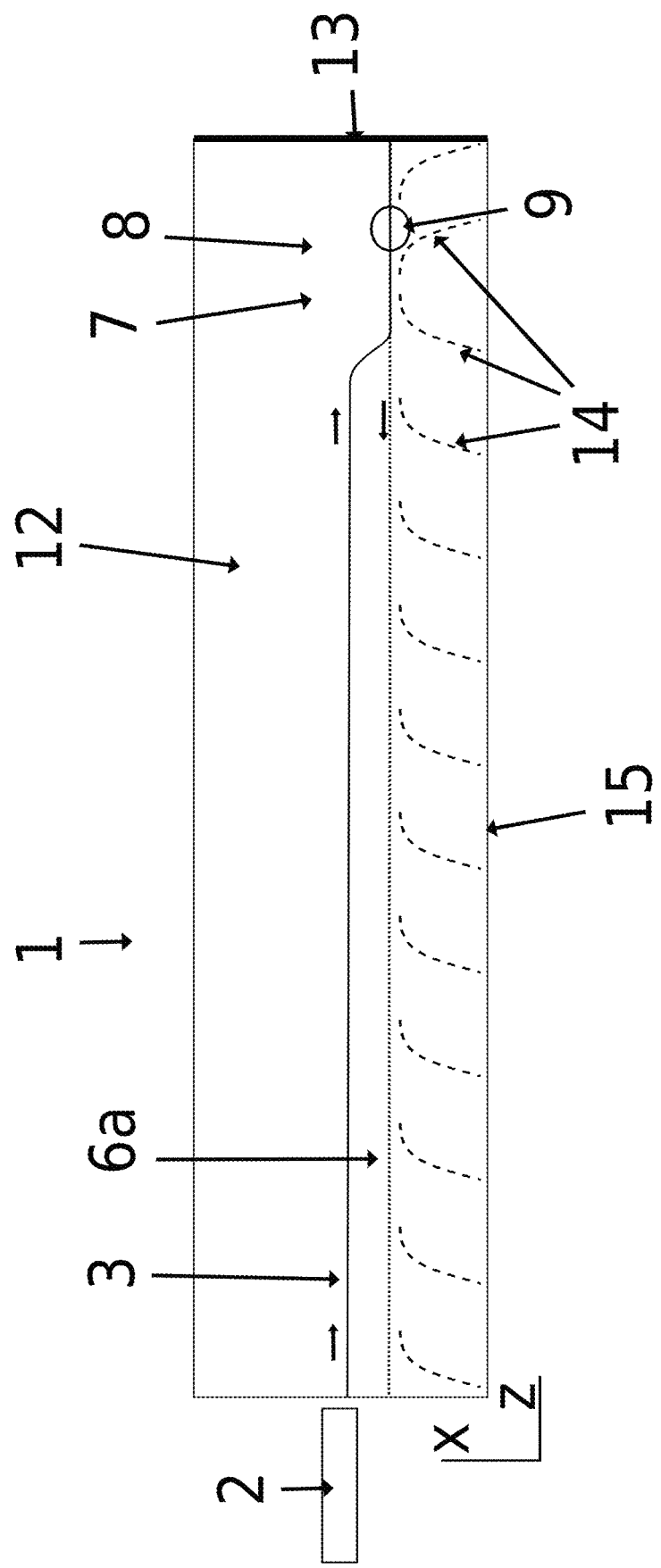
FIG. 6 schematically shows a side view of the same embodiment of the optical device as FIG. 5.

FIG. 5 schematically shows another embodiment of an optical device 1 in a top view (y-z-plane) and FIG. 6 shows the same embodiment in a side view (x-z-plane). This embodiment is in most parts identical to the embodiment shown in FIGS. 3 and 4, however, some of the pixel waveguides 14 are placed differently. In particular, there is provided for pixel waveguides 14, that are connected to the secondary fan-out waveguide 4 and to the primary fan-out waveguide 3, on both sides of the bus optical coupler 9. Thus, even the area of the coupler can be part of the active area.

Figure 7:
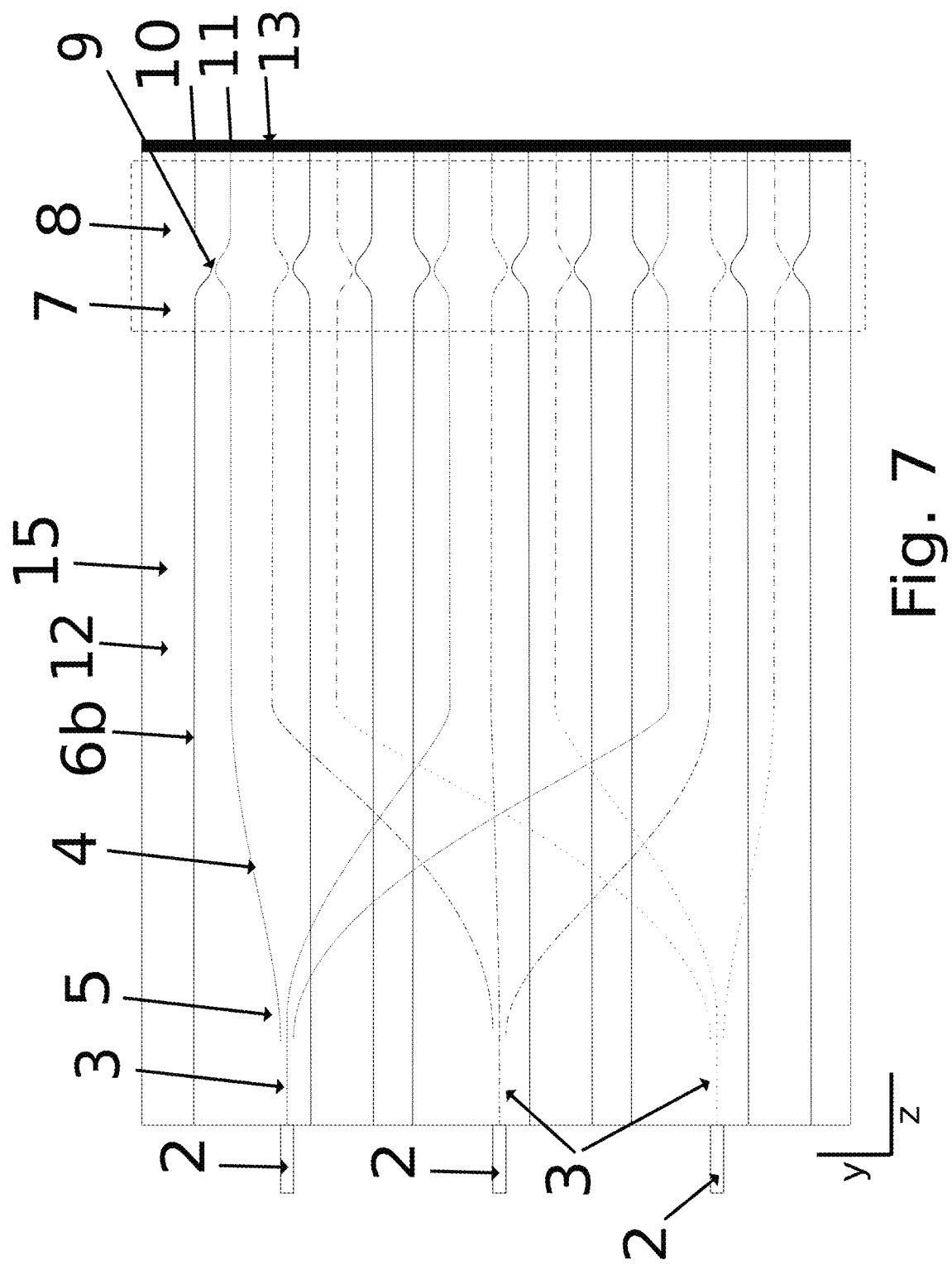
FIG. 7 schematically shows a top view of yet another embodiment of an optical device according to the present disclosure.
Figure 8:
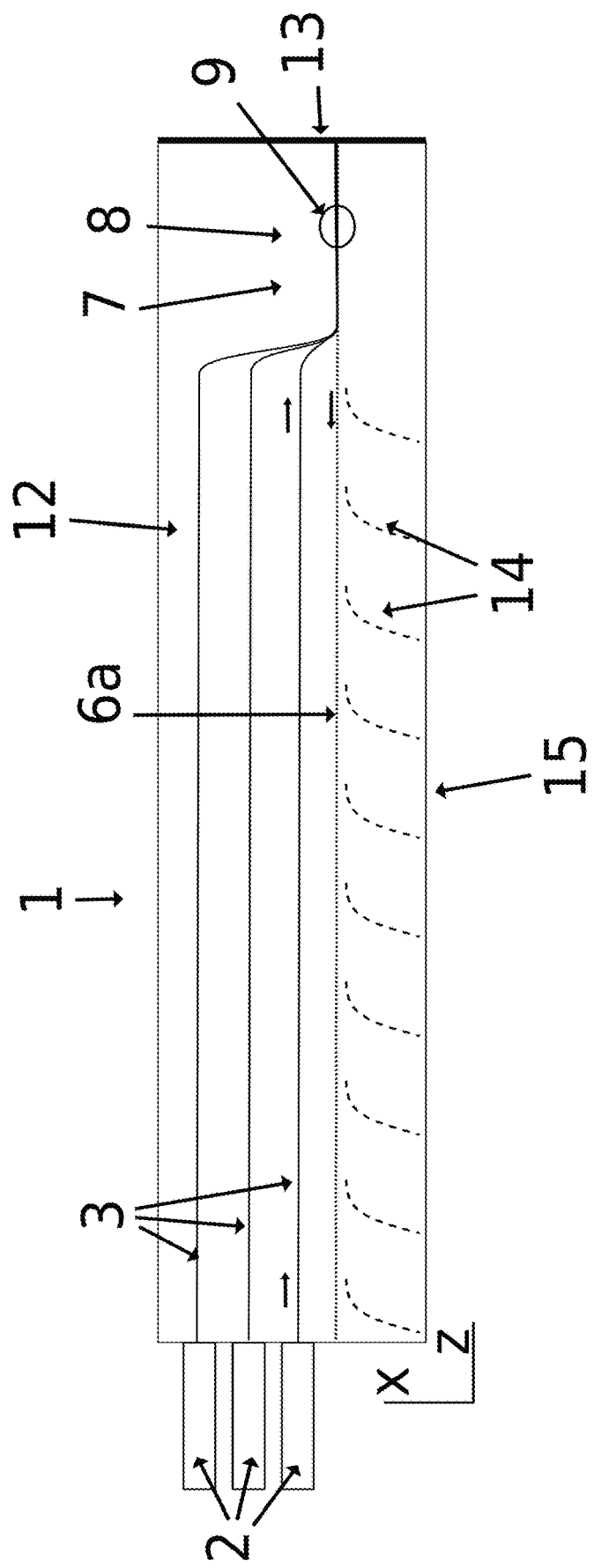
FIG. 8 schematically shows a side view of the same embodiment of the optical device as FIG. 7.

FIG. 7 schematically shows an embodiment of an optical device 1 in a top view (y-z-plane) and FIG. 8 shows the same embodiment in a side view (x-z-plane). The optical device 1 comprises three light sources 2, which each couple light into a different primary fan-out waveguide 3. Each light source 2 can be configured to emit a different wavelength, e.g. red, blue and green light. The distribution of light beams from each of the primary fan-out waveguides 3 to the respective pixels waveguides 14 (not shown in FIG. 7) works in the same way as described in the context of FIGS. 3 and 4. However, the primary fan-out waveguide 3 and the secondary fan-out waveguides 4 of each light source 2 are on different levels of depth (x-axis) in the substrate 12 for most of their length (see FIG. 8), such that they can be interleaved. In particular, the primary fan-out waveguides 3 and the secondary fan-out waveguides 4 are brought to the same level only right before the reflecting and coupling structures 7. Thus, the fan-out of each light source 2, in particular of each color, is independent from the other light sources 2, in particular the other colors. Therefore, also the reflecting and coupling structures 7 remain independent for different light sources 2 and can operate each on a single wavelength (and a different wavelength, depending on which light source they are connected to). In this way, low losses are achieved, while different colors are spread over the active area.

Figure 9:
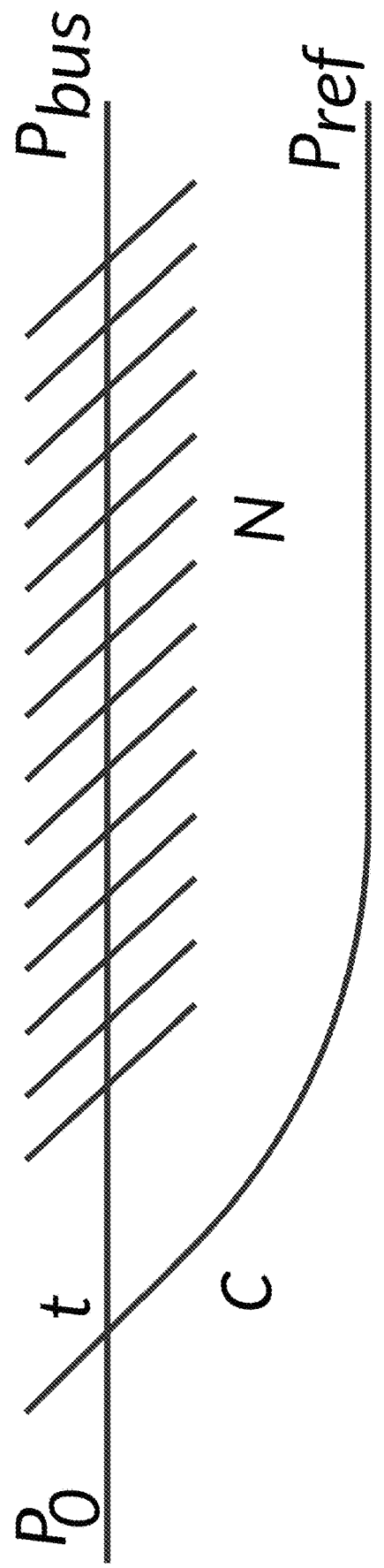
FIG. 9 schematically illustrates an estimation model of optical losses due to the number of pixel waveguides.

FIG. 9 schematically illustrates an estimation model of optical losses due to the number of pixel waveguides. When using the proposed architecture where a lot of pixel waveguides are connected to a single bus waveguides, waveguide losses in the coupling become important. Since the waveguides come very close during the evanescent coupling, small losses can occur and if a lot of them occur sequentially, exponential power loss would happen. The following will show that these losses are low enough for the present disclosure to work.

A typical pixel row consists of power carrying bus waveguides (i.e. the bus-line), and multiple couplers (i.e. the pixels), that remove/redirect part of the power carried by the bus-line towards the output facet of the substrate, in particular glass. The simplified model used for the following calculation is shown in FIG. 9.

In this arrangement, power $P_0$ is coupled to the bus-line and propagates from left to right. The bus-line (waveguide from $P_0$ to $P_{bus}$) is coupled to a reference coupler and N couplers in series (i.e. pixels, in this case the straight diagonal parallel lines). After each coupler a portion of the power carried by the bus-line is removed. Additionally, a reference waveguide coupled to the bus-line ends at the output facet on the right ($P_{ref}$). The steering of the reference waveguide towards the output facet is performed with a bending radius of 50 mm, high enough to neglect the bending losses coming from this region, and allowing a faithful estimation of the coupling C. Assuming no other power losses, the power at the output of the bus-line ($P_{bus}$) is a function of the number (N) of the couplers and their coupling coefficient C. Thus, by knowing N and C, and by monitoring $P_{ref}$, one can calculate $P_{bus}$ and estimate the losses due to the evanescent coupling mechanism.

By fabricating multiple bus-lines in the arrangement presented above, and by varying the number N of the couplers it is possible to identify and measure the presence of coupling losses, and therefore the optical transmission "t". The reference waveguide is used to characterize the coupling coefficient of the couplers, and also verify the repeatability and stability of the fabrication process.

For this study bus-lines with N=1, 20, 40 and 80 couplers were fabricated (N=1 is a device with only the reference waveguide to evaluate the coupling coefficient, whereas the other consist of 1 reference waveguide and N−1 pixel waveguides). 12 devices for each N were made, in order to have sufficient statistics (minimum statistical validity is achievable with 4 devices for each N). The couplers-waveguides were made with an interaction distance of 7.75 µm, interaction length of 0 µm, and bends with a radius of 10 mm. Bending radii related to pixel waveguides and couplers should be in the range of 10 mm to 50 mm to maintain low optical transmission losses lower than 0.2 dB.

Specifically, for the devices with N=1 the coupling coefficient was measured to the value of C=0.0132. For N=20, $t_{avg}$=0.9800±0.0278, for N=40, $t_{avg}$=0.9969±0.0113 and for N=80, $t_{avg}$=0.9968±0.0015. The results agree with each other, and for higher N values there is a higher statistical certainty. All results are within t=1, thus no apparent optical power losses seem to be induced due to the evanescent field coupling between the waveguides.

Figure 10:
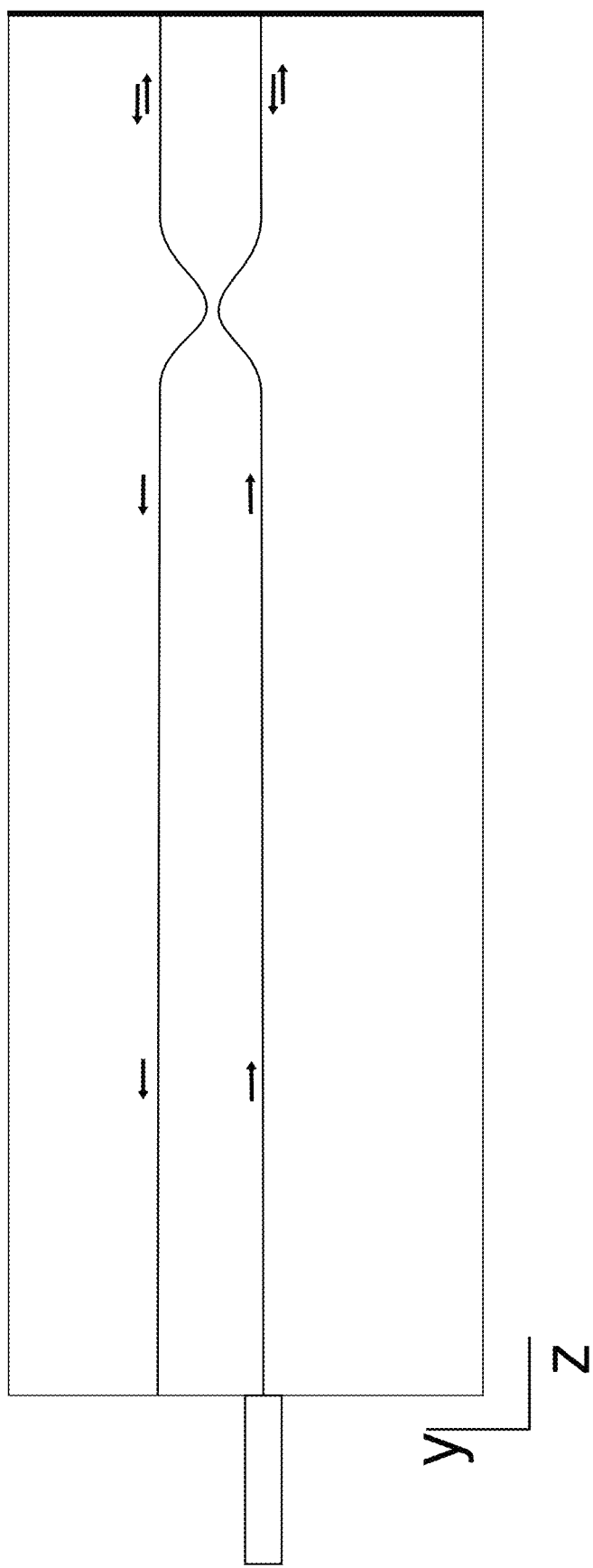
FIG. 10 schematically illustrates considerations concerning the reflecting and coupling structure.

FIG. 10 schematically illustrates considerations concerning the reflecting and coupling structure, which should however not be considered limiting to the general concept of this disclosure. Integrated directional couplers whose output facet is metal coated have been fabricated and characterized, corresponding to FIGS. 3 and 4, but with all waveguides in the same x-plane for convenience of fabrication.

In particular, the interaction region of the coupler is positioned 1 mm from the output surface, making it insensitive to the amount of polished material (300 µm to 600 µm), while proving its compactness. The interaction region of the coupler can have a distance from the output (coated and thus reflective) surface of less than 1 mm. In the case of polishing as post-processing the output surface a thickness of less than 600 µm is removed. This post-processing step can be avoided.

A difference in the length of the two arms leads to an unbalanced optical power of the device, i.e. a reduction of the power transfer from the forward-direction waveguide to the backward-direction one. For example, to convey 90% of the input power to the backward-direction waveguide, optionally the reflective facet could be perpendicular with a precision of 0.1 degrees. A mechanical polishing process may easily produce a similar angle in the output facet. To minimize this contribution, the arms of the coupler should be placed as close as possible. The distance of the arms of the coupler typically are set within a range of 15 µm to 100 µm. At the same time, the arms should not interact in order to preserve the behavior of the interferometer. To comply with these requirements, the distance between two arms of the coupler is set to 15 µm. It is worth to notice that close arms allow to shrink the length of the overall device. Supposing to have a perfectly perpendicular facet, the distance between the arms may increase up to e.g. 100 µm.

This optical circuit has been built in a 25 times 25 times 0.5 mm³ alumino-borosilicate glass (Eagle XG, Corning), through a technique known as "femtosecond-laser direct writing". This process exploits the nonlinear interaction between focused ultra-short optical pulses and a dielectric substrate, to produce permanent modifications within the material. By tuning the irradiation conditions of the sample, this approach allows the fabrication of single-mode waveguides featuring a core of circa 3 µm and a refractive index contrast of about 5*10^−3. The wavelength adopted for the measurements is 638 nm, at which these waveguides exhibit a mode field diameter of 4.2 µm, propagation losses of 0.1 dB/cm and bending losses of 0.45 dB/cm at a bending radius of 10 mm.

The characterization has been divided in two parts: first, the operation of the directional coupler without coating is evaluated. In this phase, light is coupled through a fiber in one mode on the input facet and the power distribution among the two output-modes is measured with a powermeter. The splitting ratio is then retrieved.

Afterward, the reflection on the output facet is enabled by means of its metallization: a gold-coated layer of thickness ~50 nm has been sputtered on the side facet of the sample. Then, a microscope objective (NA=0.20) is used both to couple light in one input-mode and to collect the optical power propagated back and forth through the device. A balanced external beam splitter is placed in front of the objective to isolate the output power from the input beam. The Fresnel reflection on the input facet, that is overlapped to one of the two output-modes, is measured and considered in the evaluation of the device behavior.

During our tests, the relative power transferred from the input-mode to the reflected coupled one was 92.64%, with a standard deviation of 0.91% among 10 identical devices. This working principle is also proved to be independent on the arms distance and length. The complete power transfer is hindered both by the unbalancement of the directional coupler (50.24% splitting ratio with a standard deviation of 0.96%) and, more strongly, by the tilt of the output facet. The latter, randomly produced during the polishing process, leads to a difference in the path-length of the two arms and hence imperfect device performance, which can be easily avoided by using more precise—currently available—polishing/cutting techniques, such as laser cutting.

Figure 11:
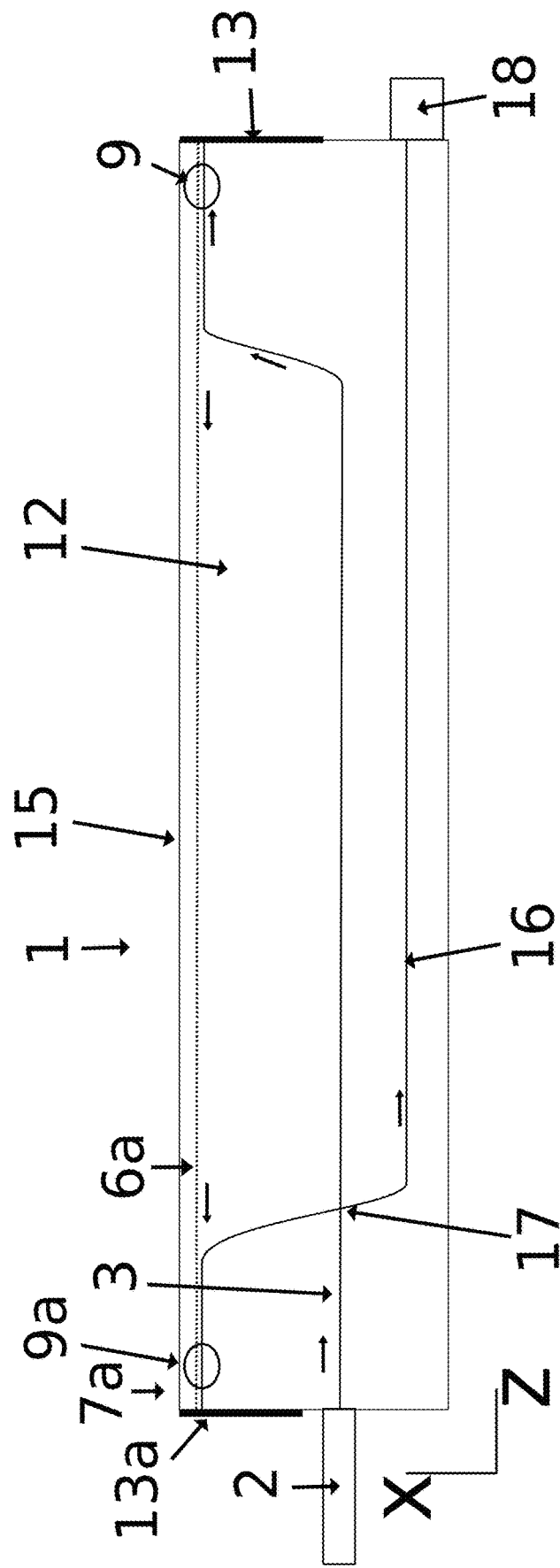
FIG. 11 schematically shows a side view of another embodiment of the optical device.

FIG. 11 shows a side view of another embodiment of the optical device 1 according to the present disclosure. This embodiment comprises a multi-layer layout. The optical device 1 functions between the light source 2 up to the bus waveguides 6a and the pixels waveguides 14 (not shown in FIG. 11) leading to the top surface 15 in substantially the same way as described in the context of the embodiment shown in FIGS. 3 and 4 (just with the x-dimension shown reversed). However, at the end of at least one of the bus waveguides 6a, there is provided for another reflecting and coupling structure 7a, in particular another interferometric structure, with another bus optical coupler 9a and a reflection at another facet 13a. The other reflecting and coupling structure 7a couples light between the bus waveguide 6a and another bus waveguide or detection waveguide 16. For simplicity, FIG. 11 shows this for the bus waveguide 6a connected to the primary fan-out waveguide 3. However, this may also (or instead) be provided for at least one bus waveguide 6b connected to a respective secondary fan-out waveguide 4. The direction of light travelling in the respective waveguides is schematically illustrated by arrows. A crossing of the detection waveguide 16 with the primary fan-out waveguide 3 or, respectively, one of the secondary fan-out waveguides 4 is avoided by bypassing it in the y-dimension at around the spot 17. The detection waveguide 16 leads to a respective detector 18, in particular a photodiode, which makes it possible to analyze the light arriving there. By the bus waveguide 6a being close to the top surface 15, this embodiment is particularly useful for touch sensing applications.

The invention claimed is:

1. An optical device comprising:
a primary fan-out waveguide;
at least one secondary fan-out waveguide;
a fan-out optical coupler for coupling a light beam between the primary fan-out waveguide and the secondary fan-out waveguide;
at least one bus waveguide associated with the at least one secondary fan-out waveguide and different from each secondary fan-out waveguide; and
a reflecting and coupling structure connecting the secondary fan-out waveguide and the bus waveguide;
wherein the reflecting and coupling structure comprises an optical coupler for coupling a light beam between the secondary fan-out waveguide and the bus waveguide,
wherein the reflecting and coupling structure comprises a bus reflective face for at least partially reflecting a light beam in the bus waveguide and a secondary fan-out reflective face for at least partially reflecting a light beam in the secondary fan-out waveguide,
wherein the optical path length between the optical coupler of the reflecting and coupling structure and the bus reflective face is the same as the optical path length between the optical coupler of the reflecting and coupling structure and the secondary fan-out reflective face.

2. The optical device according to claim 1, wherein the reflecting and coupling structure is an interferometric structure for coupling a light beam traveling in the secondary fan-out waveguide into the bus waveguide or coupling a light beam traveling in the bus waveguide into the secondary fan-out waveguide such that at least a fraction of the coupled light beam travels in the opposite direction after leaving the interferometric structure.

3. The optical device according to claim 1, wherein at least a section of the bus waveguide extends alongside at least a section of the secondary fan-out waveguide, substantially parallel to a section of the secondary fan-out waveguide.

4. The optical device according to claim 1, wherein substantially 50% of the light beam is coupled between the secondary fan-out waveguide and the bus waveguide on passing the optical coupler in one direction.

5. The optical device according to claim 1, further comprising
an additional primary fan-out waveguide;
at least one additional secondary fan-out waveguide; and
an additional fan-out optical coupler for coupling a light beam between the additional primary fan-out waveguide and the additional secondary fan-out waveguide.

6. The optical device according to claim 1, further comprising a light source coupled to the primary fan-out waveguide, for projecting a light beam into the primary fan-out waveguide.

7. An optical device comprising:
a primary fan-out waveguide;
at least one secondary fan-out waveguide;
a fan-out optical coupler for coupling a light beam between the primary fan-out waveguide and the secondary fan-out waveguide;
at least one bus waveguide associated with the at least one secondary fan-out waveguide and different from each secondary fan-out waveguide;
a reflecting and coupling structure connecting the secondary fan-out waveguide and the bus waveguide; and
a transparent substrate, wherein the secondary fan-out waveguide and the bus waveguide are provided in the transparent substrate by femtosecond direct laser writing.

8. An optical device comprising:
a primary fan-out waveguide;
at least one secondary fan-out waveguide;
a fan-out optical coupler for coupling a light beam between the primary fan-out waveguide and the secondary fan-out waveguide;
at least one bus waveguide associated with the at least one secondary fan-out waveguide and different from each secondary fan-out waveguide;
a reflecting and coupling structure connecting the secondary fan-out waveguide and the bus waveguide; and
a transparent substrate comprising a facet wherein at least one of a bus reflective face or a secondary fan-out reflective face are provided by at least one of the facet of the transparent substrate or a coating of the facet of the transparent substrate.

9. An optical device comprising:
a primary fan-out waveguide;
at least one secondary fan-out waveguide;
a fan-out optical coupler for coupling a light beam between the primary fan-out waveguide and the secondary fan-out waveguide;
at least one bus waveguide associated with the at least one secondary fan-out waveguide and different from each secondary fan-out waveguide;
a reflecting and coupling structure connecting the secondary fan-out waveguide and the bus waveguide; and at least one pixel waveguide for receiving a light beam from the at least one bus waveguide or for directing a light beam to the at least one bus waveguide, the pixel waveguide bending away from the bus waveguide.

10. An optical device comprising:
a primary fan-out waveguide;
at least one secondary fan-out waveguide;
a fan-out optical coupler for coupling a light beam between the primary fan-out waveguide and the secondary fan-out waveguide;
at least one bus waveguide associated with the at least one secondary fan-out waveguide and different from each secondary fan-out waveguide;
a reflecting and coupling structure connecting the secondary fan-out waveguide and the bus waveguide; and
a phase adjusting element for adjusting the relative optical path length of the secondary fan-out waveguide and of the bus waveguide in the reflecting and coupling structure, wherein the phase adjusting element comprises at least one of a phase shifter or a piezo-mirror.

11. An optical device comprising:
a primary fan-out waveguide;
at least one secondary fan-out waveguide;
a fan-out optical coupler for coupling a light beam between the primary fan-out waveguide and the secondary fan-out waveguide;
at least one bus waveguide associated with the at least one secondary fan-out waveguide and different from each secondary fan-out waveguide;
a reflecting and coupling structure connecting the secondary fan-out waveguide and the bus waveguide; and further comprising
at least a further bus waveguide associated with the secondary fan-out waveguide and different from each secondary fan-out waveguide, wherein the reflecting and coupling structure also connects the secondary fan-out waveguide and the further bus waveguide, wherein the reflecting and coupling structure comprises a tritter for coupling a light beam between the secondary fan-out waveguide, the bus waveguide and the further bus waveguide.

12. A display, comprising a display panel and a backlight unit formed by an optical device, the optical device comprising:
a primary fan-out waveguide,
at least one secondary fan-out waveguide;
a fan-out optical coupler for coupling a light beam between the primary fan-out waveguide and the secondary fan-out waveguide,
at least one bus waveguide associated with the at least one secondary fan-out waveguide and different from each secondary fan-out waveguide, and
a reflecting and coupling structure connecting the secondary fan-out waveguide and the bus waveguide.

* * * * *